(12) United States Patent
Glovinski

(10) Patent No.: US 9,660,527 B2
(45) Date of Patent: May 23, 2017

(54) ZERO VOLTAGE SWITCHING

(71) Applicant: Solaredge Technologies, Ltd., Hod Hasharon (IL)

(72) Inventor: Tzachi Glovinski, Petah Tikva (IL)

(73) Assignee: Solaredge Technologies Ltd., Herziliya Pituach (IL)

(*) Notice: Subject to any disclaimer, the term of this patent is extended or adjusted under 35 U.S.C. 154(b) by 18 days.

(21) Appl. No.: 14/585,280

(22) Filed: Dec. 30, 2014

(65) Prior Publication Data
US 2015/0115909 A1   Apr. 30, 2015

Related U.S. Application Data

(63) Continuation of application No. 13/338,330, filed on Dec. 28, 2011, now Pat. No. 8,957,645, which is a continuation of application No. 12/409,604, filed on Mar. 24, 2009, now Pat. No. 8,111,052.

(60) Provisional application No. 61/039,046, filed on Mar. 24, 2008.

(51) Int. Cl.
*H02M 3/158* (2006.01)
*H02M 1/34* (2007.01)
*H02M 7/5387* (2007.01)
*H02M 7/48* (2007.01)

(52) U.S. Cl.
CPC .......... *H02M 3/158* (2013.01); *H02M 1/34* (2013.01); *H02M 7/5387* (2013.01); *H02M 2007/4811* (2013.01); *Y02B 70/1441* (2013.01)

(58) Field of Classification Search
CPC ...... H02M 3/155; H02M 3/156; H02M 3/158; H02M 3/1582
See application file for complete search history.

(56) References Cited

U.S. PATENT DOCUMENTS 5,097,196 A * 3/1992 Schoneman ........ H02M 3/1582
                                                    323/222

* cited by examiner

*Primary Examiner* — Gary L Laxton
(74) *Attorney, Agent, or Firm* — Banner & Witcoff, Ltd.

(57) ABSTRACT

A method for providing non-resonant zero-voltage switching in a switching power converter. The switching power converter converts power from input power to output power during multiple periodic switching cycles. The switching power converter includes a main switch and an auxiliary capacitor adapted for connecting to the main switch, and an inductor connectable to the auxiliary capacitor. When the main switch is on, a previously charged (or previously discharged) auxiliary capacitor is connected to the main switch with auxiliary switches. The main switch is switched off with zero voltage while discharging non-resonantly (charging) the auxiliary capacitor by providing a current path to the inductor. The auxiliary capacitor is disconnected from the main switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor.

33 Claims, 7 Drawing Sheets

$Q_1$ on, $Q_2$ off, $Q_3$ on, $Q_4$ off (Buck Phase)

$Q_1$ off, $Q_2$ on, $Q_3$ off, $Q_4$ on (Boost phase)

ZERO VOLTAGE SWITCHING

CROSS REFERENCE TO RELATED APPLICATIONS

The present application is a continuation of U.S. patent application Ser. No. 13/338,330 filed on Dec. 28, 2011, which is a continuation application of U.S. patent application Ser. No. 12/409,604 filed on Mar. 24, 2009, claims priority to U.S. provisional application 61/039,046 filed on Mar. 24, 2008. These applications are hereby incorporated by reference in their entirety.

BACKGROUND

1. Technical Field

The present invention relates to switching converters and to specifically a method and devices for zero voltage switching for reducing switching losses in switching converters.

2. Description of Related Art

FIG. 1 shows a typical conventional buck-boost DC-to-DC converter circuit 20. The buck circuit of buck-boost DC-to-DC converter 20 has an input voltage $V_{in}$ with an input capacitor $C_1$ connected in parallel across $V_{in}$. Two switches are implemented as field effect transistors (FET) with integral diodes: a high side buck switch $Q_1$ and a low side buck switch $Q_2$ connected in series by connecting the source of $Q_1$ to the drain of $Q_2$. The drain of $Q_1$ and the source of $Q_2$ are connected parallel across an input capacitor $C_1$. A node A is formed between switches $Q_1$ and $Q_2$ to which one end of an inductor 206 is connected. The other end of inductor 206 is connected to the boost circuit of buck-boost DC-to-DC converter 20 at a node B. Node B connects two switches: a high side boost switch $Q_4$ and a low side boost switch $Q_3$ together in series where the source of $Q_4$ connects to the drain of $Q_3$ to form node B. The drain of $Q_4$ and the source of Q3 connect across an output capacitor $C_2$ to produce the output voltage $V_{out}$ of buck-boost DC-to-DC converter 20.

FIG. 2a illustrates the buck phase or on-state circuit of DC-to-DC converter circuit 20 shown in FIG. 1, the input voltage source $V_{in}$ is directly connected to inductor 206 and the load is isolated from $V_{in}$ because $Q_1$ is on, $Q_2$ is off, $Q_3$ is on and $Q_4$ is off. These switch positions: $Q_1$ on, $Q_2$ off, $Q_3$ on and $Q_4$ off; result in accumulating energy in inductor 206 since source $V_{in}$ is directly connected to inductor 206. In the on-state, output capacitor $C_2$ supplies energy to the load.

FIG. 2b illustrates the boost phase or off-state circuit of DC-to-DC converter circuit 20, Inductor 206 is connected in parallel across the load and capacitor $C_2$ because $Q_1$ is off, $Q_2$ is on, $Q_3$ is off and $Q_4$ is on. $Q_1$ being off isolates inductor 206 from the input voltage ($V_{in}$) and capacitor ($C_1$). The stored energy in inductor 206 (as a result of the previous On-state) is transferred from inductor 206 to $C_2$ and the load.

Two common methods of operating DC-to-DC converter circuit 20 are in either continuous mode or discontinuous mode. If the current through the inductor 206 never falls to zero during a commutation cycle (i.e. the time period to perform both the on-state and the off-state), DC-to-DC converter circuit 20 is said to operate in continuous mode and typically the on-state operates for a shorter period of time when compared to the off-state. Discontinuous mode of operation for DC to DC converter circuit 20 occurs when the amount of energy required by the load is small enough to be transferred in a time period smaller than the whole commutation cycle. Typically, the current through inductor 206 falls to zero for a short time period after the off-state period and therefore inductor 206 is completely discharged at the end of the commutation cycle. The commutation cycle therefore includes the on-state, the off-state and the short time period during which the inductor current is zero.

A conventional "resonant" method for achieving virtually zero power loss when switching a switch is to apply a direct current voltage input voltage $V_{in}$ across a switch (with a diode connected across the switch, the diode is reverse biased with respect to $V_{in}$) in series with an inductor L and a capacitor C. The output voltage of the circuit is derived across the capacitor. The output voltage of the circuit could then in principle be connected to the input of a power converter, for example a buck-loaded series tank circuit with load. The resonant frequency of the series inductor L and capacitor C is given by Eq. 1 and the corresponding resonant periodic time T given in Eq. 2.

$$f_o = 1/2\pi(LC)^{1/2} \qquad \text{Eq. 1}$$

$$T = 1/f_o \qquad \text{Eq. 2}$$

A pulse response of the circuit means that when the switch turns on, there is both zero current in the inductor and zero voltage across the capacitor (Power=Volts×Current×0× 0=zero power loss at turn on). During steady state operation of the circuit, the inductor current and capacitor voltage are sinusoidal and have a 90 degrees phase shift with respect to each other. When the switch turns off (the on period of the switch corresponds to half of the resonant periodic time) there is zero current in the inductor and maximum positive voltage (i.e. $V_{capacitor} = V_{in}$) across the capacitor (Power=Volts×Current=$V_{in}$×0=zero power loss at turn off).

BRIEF SUMMARY

According to an embodiment of the present invention there is provided a method for providing non-resonant zero-voltage switching in a switching power converter. The switching power converter converts power from input power to output power during multiple periodic switching cycles. The switching power converter includes a main switch and an auxiliary capacitor adapted for connecting to the main switch, and an inductor connectible to the auxiliary capacitor. When the main switch is on, a previously charged (or previously discharged) auxiliary capacitor is connected to the main switch with auxiliary switches. The main switch is switched off with zero voltage while discharging non-resonantly (charging) the auxiliary capacitor by providing a current path to the inductor. The auxiliary capacitor is disconnected from the main switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. The switch may include a: silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), diode for alternating current (DIAC), and/or triode for alternating current TRIAC.

According to the present invention there is provided a switching converter including a buck stage and/or a boost stage including a main switch connecting an input voltage terminal to a first node; an auxiliary capacitor adapted for connecting to the main switch and an inductor adapted for connecting to the first node. The first node is connectible to the auxiliary capacitor by at least two current paths. When the main switch is on, a previously charged (or previously discharged) auxiliary capacitor is connected across the main switch typically with auxiliary switches. The main switch is switched off with zero voltage while discharging (charging) the auxiliary capacitor by providing a current path to the inductor. The auxiliary capacitor is disconnected from the switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. The switching converter may include a single buck stage or a single boost stage.

According to the present invention there is provided a switching converter included a plurality of main switches interconnected in a full bridge topology, the main switches including a first switch, a second switch, a third switch and a fourth switch. A pair of input voltage terminals are attachable at a first node connecting the first and third switches and at a second node connecting the second and fourth switches. A first output voltage terminal is operatively attached at a third node connecting the third and fourth switches. A second output voltage terminal is operatively attached at a fourth node connecting the first and second switches. Bidirectional switches are interconnected in a full bridge topology. The bidirectional switches include a first bidirectional switch, a second bidirectional switch, a third bidirectional switch and a fourth bidirectional switch. The third node connects the first and third bidirectional switches and the fourth node connects the second and fourth bidirectional switches. An auxiliary capacitor connects at one end at a node connecting the first and second bidirectional switches and at the other end at a node connecting the second and fourth bidirectional switches. The main switches are preferably configured to be periodically switched on and off during a plurality of switching cycles. One or more of the main switches is on. A previously charged (or previously discharged) auxiliary capacitor is connected across the main switch typically with auxiliary switches. The main switch is switched off with zero voltage while discharging (charging) the auxiliary capacitor by providing a current path to the inductor. The auxiliary capacitor is disconnected from the switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. A first inductor is typically attachable between the first output voltage terminal and the third node. A second inductor is typically attachable between the second output voltage terminal and the fourth node. The first and second inductor is optionally a single split inductor or inductor is a single inductor connected in series to a transformer primary or other circuitry.

BRIEF DESCRIPTION OF THE DRAWINGS

The invention is herein described, by way of example only, with reference to the accompanying drawings, wherein.

Figure 1:
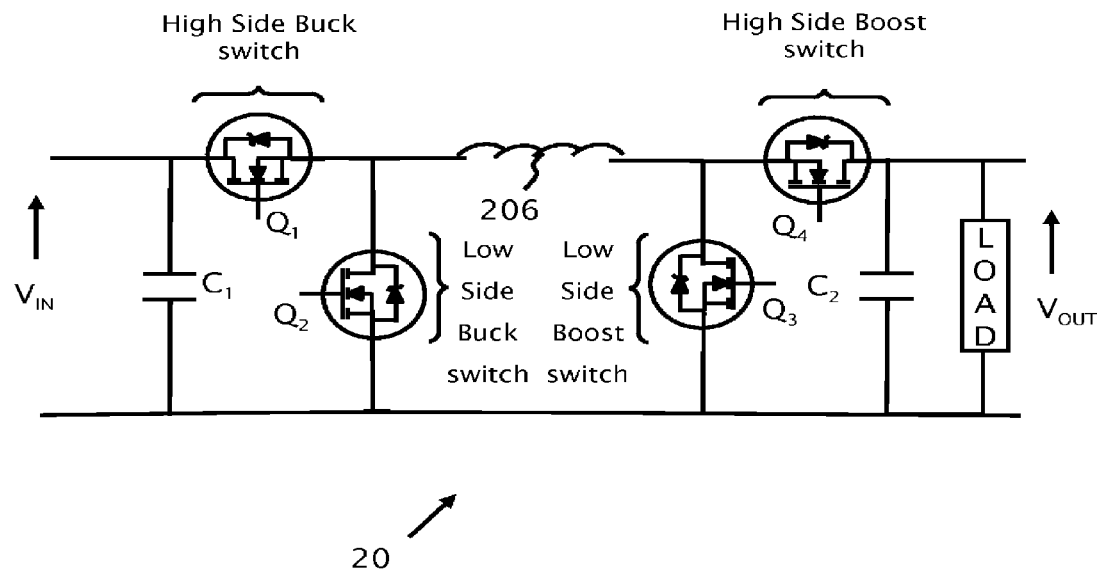
FIG. 1 shows a typical conventional buck-boost DC-to-DC converter circuit.
Figure 2A:
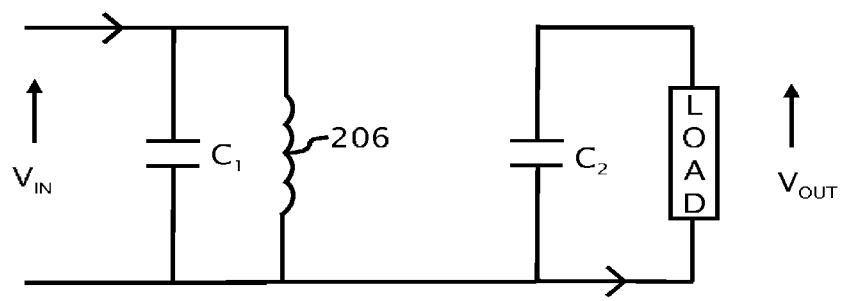
FIG. 2a illustrates the buck phase or on-state circuit of conventional DC-to-DC converter circuit.
Figure 2B:
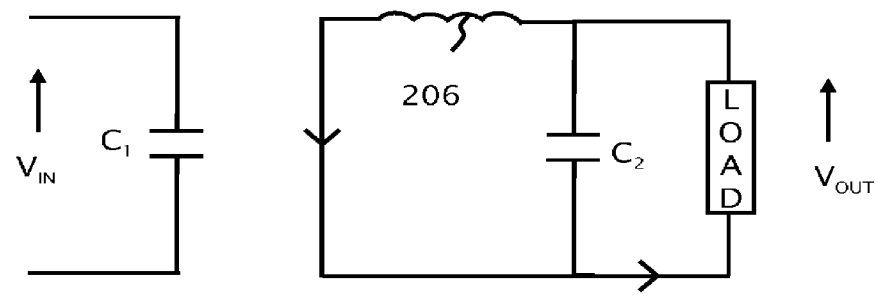
FIG. 2b illustrates the boost phase or off-state circuit of DC-to-DC converter circuit 20.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

It should be noted, that although the discussion herein relates to buck, boost, buck-boost full bridge switching topologies, the present invention may, by non-limiting example, alternatively be configured as well using other types of switching power DC-DC converters including half bridge, flyback, Cuk, as well as DC-AC inverters for both power supply and regulation applications.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The term "switch" as used herein refers to any type of switch known in the art of electronics switches such as silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), DIAC, and TRIAC.

The term "zero voltage switching" (or "ZVS") as used herein is that the peak voltage across a switch, is reduced to substantially zero volts when the switch is being turned either on or off.

The term "cycle" or "commutation cycle" refers to the periodicity of main switch positions in a circuit which performs a process of electrical power conversion or inversion.

The term "power converter" as used herein applies to DC-to-DC converters, AC-to-DC converters, DC-to-AC inverters, buck converters, boost converters, buck-boost converters, buck/boost converters, full-bridge converters and half-bridge converters or any other type of electrical power conversion/inversion known in the art.

The term "buck-boost" converter as used herein refers to a buck converter followed by a boost converter.

The term "non-resonant" as used herein to exclude resonant and quasi-resonant circuits and methods as are known in the prior art for achieving zero voltage switching.

The terms "charging" and "discharging" in the context of the present invention in reference to charging and discharging a capacitor, are used herein interchangeably except that current flow while charging and discharging is usually in the opposite direction.

Reference is now made to FIG. 3 (FIGS. 3a-3d) showing a buck-boost DC-to-DC converter 40 according to an embodiment of the present invention. A buck circuit 42 of buck-boost DC-to-DC converter 40 has an input voltage $V_{in}$ with an input capacitor $C_1$ connected in parallel across $V_{in}$. Two switches $Q_1$ and $Q_2$ are connected in series at node A by connecting the source of $Q_1$ to the drain of $Q_2$. The drain of $Q_1$ and the source of $Q_2$ are placed in parallel across capacitor $C_1$. A zero-voltage switching feature according to embodiments of the present invention is provided using components: switches $Q_{bu}$, $Q_{abu}$, auxiliary (AUX) capacitor $C_{bu}$, and diodes $D_{2bu}$ and $D_{abu}$ in buck circuit 42. The cathode of diode $D_{2bu}$ is connected to one end of capacitor $C_{bu}$. The other end of $C_{bu}$ is connected to the drain of switch $Q_{bu}$. The drain of $Q_{abu}$ and the anode of diode $D_{2bu}$ are connected in parallel across capacitor $C_1$. The cathode of diode $D_{abu}$ is connected to the source of switch $Q_{bu}$. The anode of diode $D_{abu}$ and the source of switch $Q_{abu}$ are connected across with capacitor $C_{bu}$. Node A shared by the cathode of diode $D_{abu}$ and the source of switch $Q_{bu}$ is connected to the buck end of inductor 206.

The other end of inductor 206 is connected to a boost circuit 44 of buck boost DC-to-DC converter 40 at node B. Two switches $Q_4$ and $Q_3$ are connected in series. The source of $Q_4$ connects to the drain of $Q_3$ at node B. The drain of $Q_4$ and the source of $Q_3$ connect across capacitor $C_2$, across capacitor $C_2$ is the output voltage $V_{out}$ of buck-boost DC-to-DC converter 40. Additional components: switches $Q_{bo}$, $Q_{abo}$, auxiliary (AUX) capacitor $C_{bo}$, and diodes $D_{1bo}$, $D_{abo}$ are added to achieve zero-voltage switching in boost circuit 44. The anode of diode $D_{1bo}$ is connected to one end of capacitor $C_{bo}$. The other end of $C_{bo}$ is connected to the source of switch $Q_{bo}$ and the drain of $Q_{abo}$. The source of $Q_{abo}$ and the cathode of diode $D_{1bo}$ are connected in parallel across capacitor $C_2$. The anode of diode $D_{abo}$ is connected to the drain of switch $Q_{bo}$. The node between the anode of diode $D_{abo}$ and the drain of switch $Q_3$ are connected to node B. The cathode of diode $D_{abo}$ and the source of switch $Q_{bo}$ are connected across with capacitor $C_{bo}$.

Figure 3A:
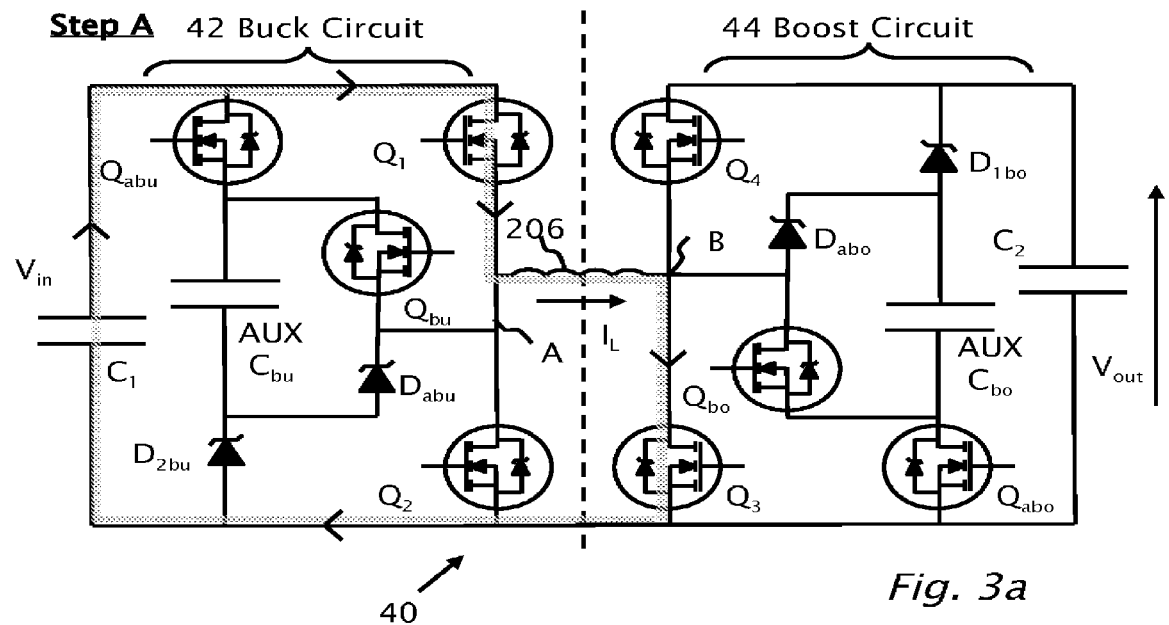
FIG. 3 (FIGS. 3a-3d) illustrate a buck-boost DC-to-DC converter, according to an embodiment of the present invention.
Figure 3B:
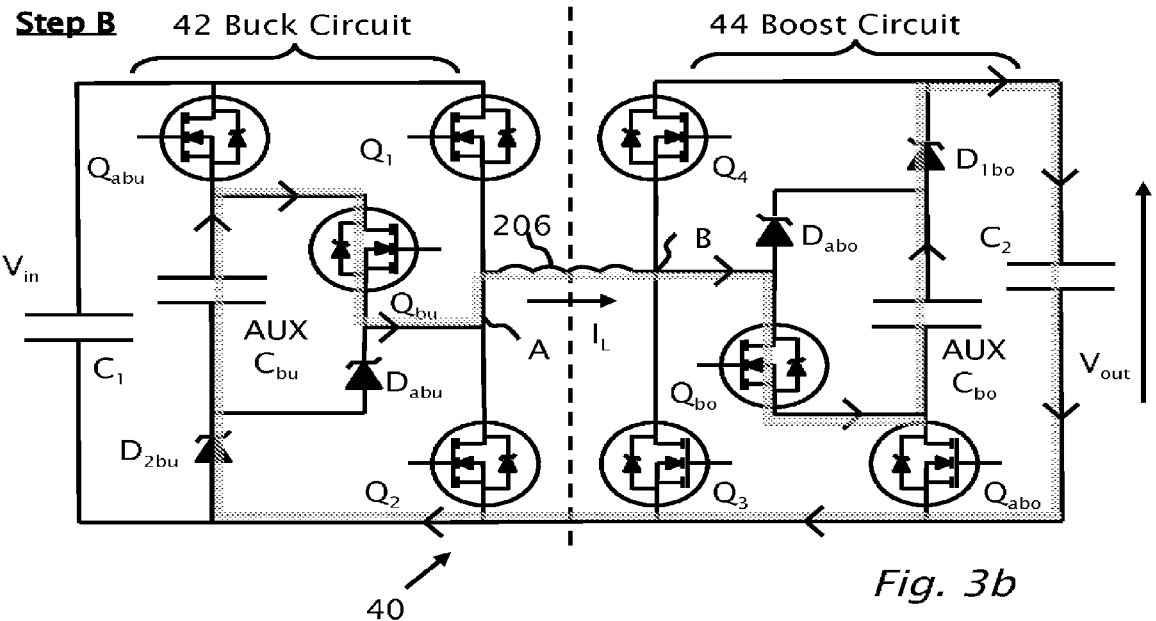
Figure 3C:
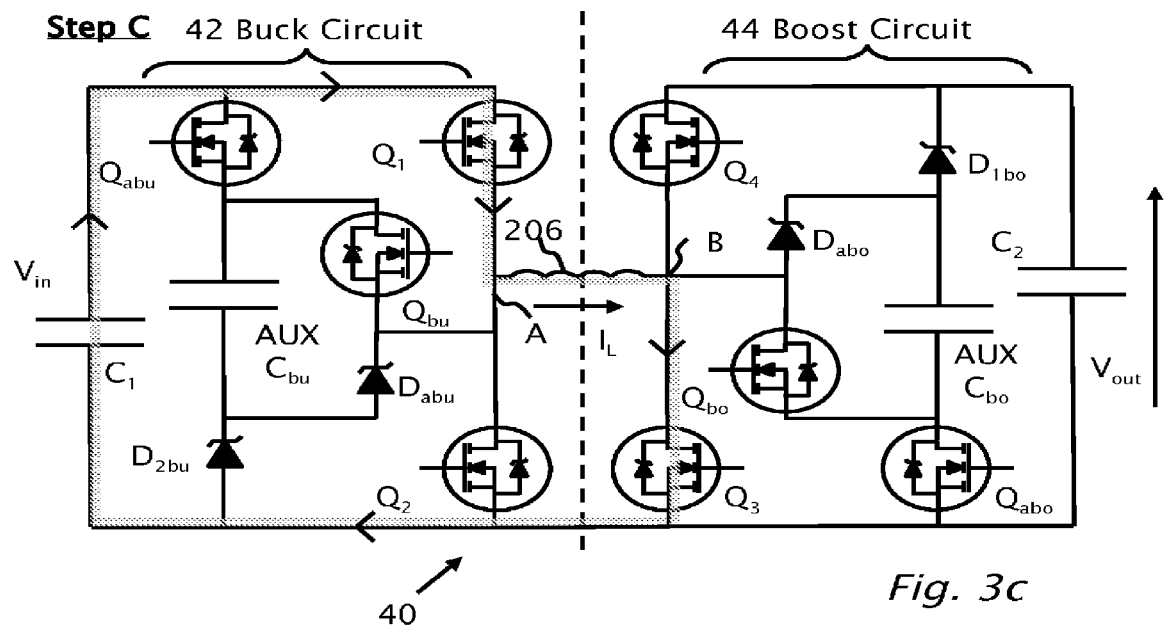
Figure 3D:
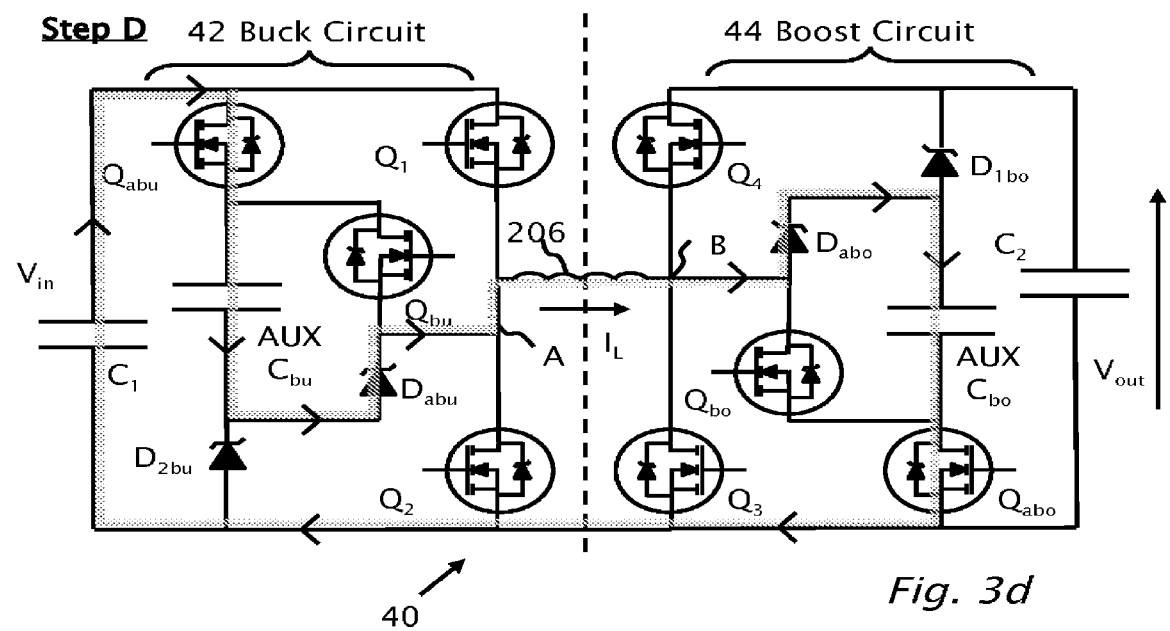
Figure 4:
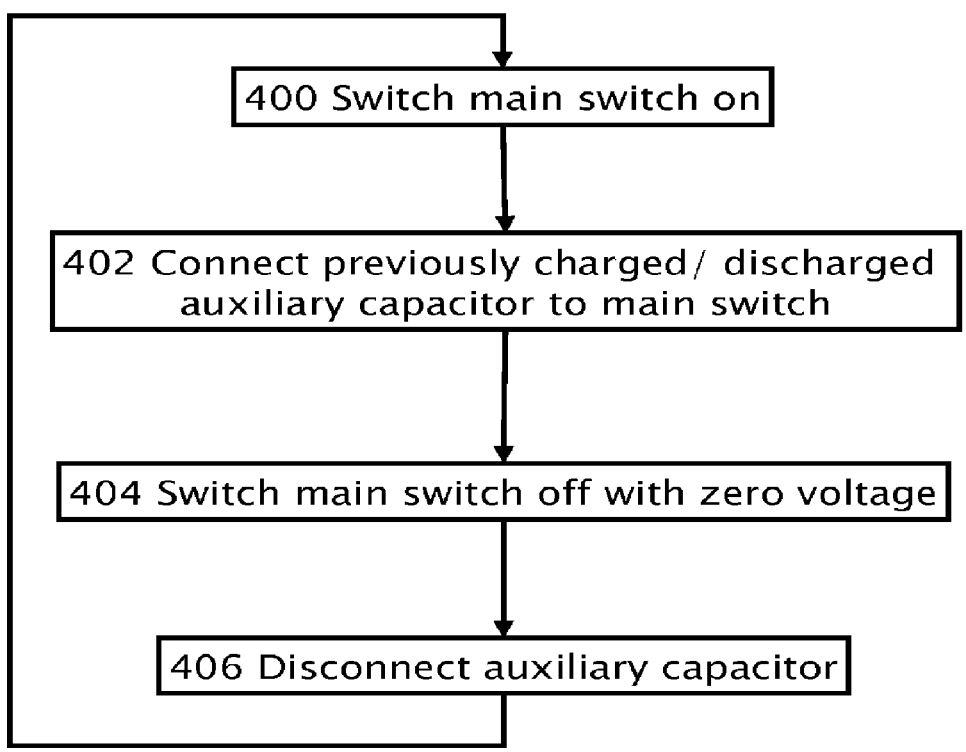
FIG. 4 shows a flow diagram of a method for zero voltage switching, running in either continuous or discontinuous mode during the turn off of main switches $Q_1$ and/or $Q_3$, according to embodiments of the present invention.

Reference is still made to buck-boost DC-to-DC converter 40 shown in FIGS. 3a-3d which illustrate operation of buck-boost DC-to-DC converter 40. Reference is now also made to FIG. 4 showing a flow diagram of a method for zero voltage switching, in boost and/or buck topologies during the turn off of main switches $Q_1$ and/or $Q_3$, according to embodiments of the present invention.

Step A.

Before switching phase: In FIG. 3a, current flow in buck circuit 42 and boost circuit 44 is indicated by arrow markings and gray shaded line. In buck circuit 42, switch $Q_1$ is on (step 400), switch $Q_2$ is off and switch $Q_{bu}$ is on. Auxiliary (AUX) capacitor $C_{bu}$ is previously charged to $V_{in}$ and connected to the source of $Q_1$ (step 402). $T_L$ current flows from input, through $Q_1$ through node A to inductor 206.

Meanwhile, in boost circuit, $Q_3$ is on, $Q_4$ is off, $Q_{bo}$ is on. $C_{bo}$ is previously charged to $V_{out}$. $I_L$ current flows from inductor 206 through node B.

Step B.

Switching off phase: In FIG. 3b, current flow in buck circuit 42 and boost circuit 44 is indicated by the arrow markings and gray shaded lines. Switch $Q_1$ turns off at substantially zero voltage (step 404). Switch $Q_{bu}$ is still on. $I_L$ current (of inductor 206) discharges capacitor $C_{bu}$ to zero voltage through node A through diode $D_{2bu}$. $Q_2$ turns on and $Q_{bu}$ turns off disconnecting (step 406) auxiliary (AUX) capacitor $C_{bu}$.

Meanwhile, in boost circuit 44 $Q_3$ turns off at substantially zero voltage. $I_L$ current (of inductor 206) discharges capacitor $C_{bo}$ to zero voltage through node B through diode $D_{1bo}$. Q4 turns on and $Q_{bo}$ turns off disconnecting auxiliary (AUX) capacitor $C_{bo}$.

Thus ends one switching cycle. Now, for the next switching cycle:

Step C.

Before switching phase: In FIG. 3c current flow in buck circuit 42 and boost circuit 44 is indicated by the arrow markings and Grey shaded line. Switch $Q_1$ is on, Switch $Q_2$ is off (step 400). Switch $Q_{abu}$ turns on. $C_{bu}$ remains discharged from the previous switching cycle and still connected to the source of $Q_1$ (step 402). $I_L$ current flows from input through node A, through $Q_1$ to inductor 206.

Meanwhile in boost circuit 44: $Q_3$ is on, $Q_4$ is off, $Q_{abo}$ turns on. $C_{bo}$ remains discharged from the previous switching cycle.

Step D.

Switching off phase: In FIG. 3d, current flow in buck circuit 42 and boost circuit 44 is indicated by the arrow markings and Grey shaded line. Switch $Q_1$ turns off with substantially zero voltage (step 404). Switch $Q_{bu}$ is still on. $I_L$ current (of inductor 206) charges capacitor $C_{bu}$ to $V_{in}$ voltage through node A through diode $D_{abu}$. Switch $Q_2$ turns on. $Q_{abu}$ is turned off and auxiliary (AUX) capacitor $C_{bu}$ disconnected from the source of $Q_1$ (step 406).

Meanwhile in the boost circuit 44, $Q_3$ turns off at substantially zero voltage. $I_L$ current (of inductor 206) charges capacitor $C_{bo}$ to $V_{out}$ voltage through node B through diode $D_{abo}$. Q4 turns on and $Q_{abo}$ turns off.

Thus ends the second switching cycle. Now, for the next switching cycle the sequence starts again at Step A.

Figure 5:
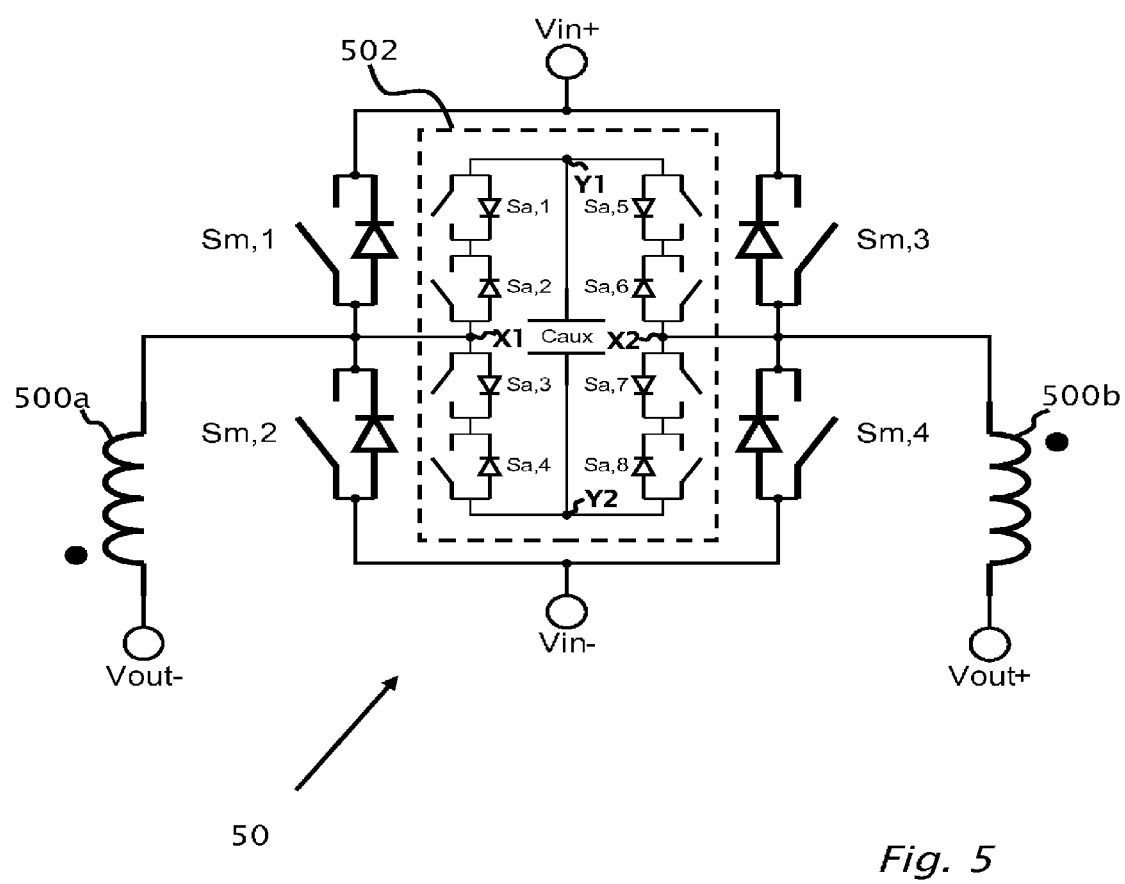
FIG. 5 shows another embodiment of present invention as applied to a full bridge switched DC-to-DC converter.

FIG. 5 shows a further embodiment of present invention as applied to a full bridge DC to DC converter 50. Full bridge DC to DC converter 50 has four main switches $S_{m,1}$, $S_{m,2}$, $S_{m,3}$ and $S_{m,4}$ connected together in a full bridge configuration. Each of the four main switches ($S_{m,1}$, $S_{m,2}$, $S_{m,3}$ and $S_{m,4}$) have respective diode shunts connected in parallel thereto. The diodes placed across switches $S_{m,1}$ and $S_{m,2}$ are in both the same direction similarly the diodes of $S_{m,3}$ and $S_{m,4}$ are both in the same direction. All diodes connected across switches $S_{m,1}$, $S_{m,2}$, $S_{m,3}$ and $S_{m,4}$ are reverse biased with respect to the input voltage $V_{in}$. An input voltage ($V_{in}^-$) of full bridge DC-to-DC converter 50 is connected across the node between switches $S_{m,2}$ and $S_{m,4}$ and an input voltage ($V_{in}^+$) is connected at the node between switches $S_{m,1}$ and $S_{m,3}$. An output voltage ($V_{out}^-$) of full bridge DC-to-DC converter 50 is connected across the node between switches $S_{m,1}$ and $S_{m,2}$ connected through a split inductor 500a and output voltage $V_{out}+$ is connected at the node between switches $S_{m,3}$ and $S_{m,4}$ through a split inductor 500b. A bi-directional switch unit 502 includes four bidirectional switches. Each bidirectional switch includes has two switches in series, e.g. ($S_{a,1}$, $S_{a,2}$) each with a diode connected across each switch with the diodes connected in opposite directions. Bi-directional switch unit 502 is connected at X1 to the node between switches $S_{m,1}$ and $S_{m,2}$ and at X2 to the node between switches $S_{m,3}$ and $S_{m,4}$. Bidirectional auxiliary switches are formed between nodes Y1 and X1 using switches $S_{a,1}$ and $S_{a,2}$, between nodes Y1 and X2 using switches $S_{a,5}$ and $S_{a,6}$, between nodes Y2 and X1 using switches $S_{a,3}$ and $S_{a,4}$ and between nodes Y2 and X2 using switches $S_{a,7}$ and $S_{a,8}$. An auxiliary capacitor $C_{aux}$ is connected between nodes Y1 and Y2.

Figure 6:
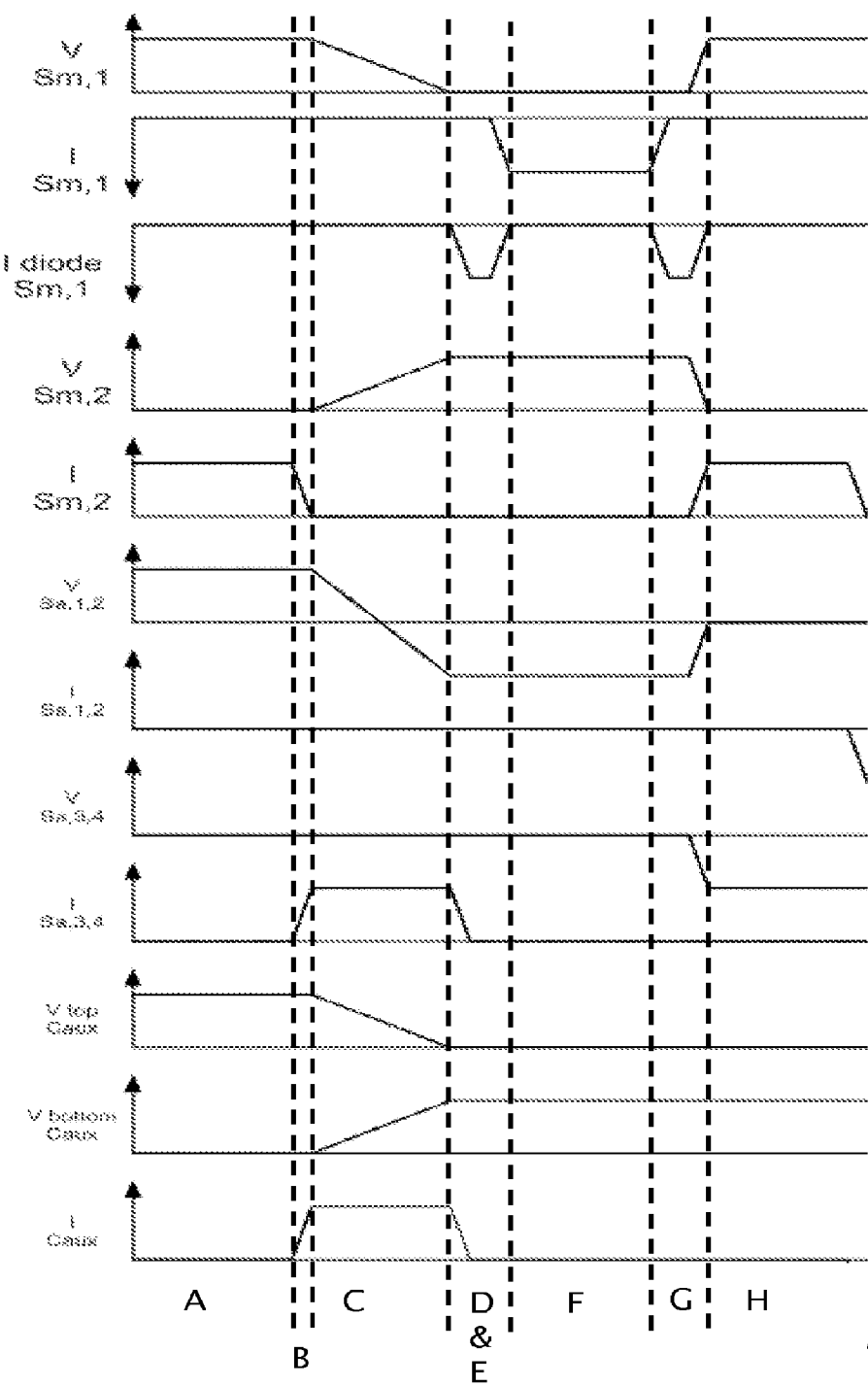
FIG. 6 shows a timing diagram of selected voltages and currents in the embodiment of FIG. 5.

In different embodiments the present invention may be configured to operate in either continuous or discontinuous current mode. The operation of full bridge circuit 50, according to a feature of the present invention and with reference again to FIG. 5 and FIG. 6 which shows a timing diagram of selected voltages and currents for steps A to H is as follows:

A) Switches $S_{m,2}$, $S_{m,3}$, $S_{a,3}$, $S_{a,4}$, $S_{a,5}$, and $S_{a,6}$ are turned on, all other switches are off. Current flows from $V_{out}^-$ to $V_{in}^-$ through inductor 500a, and through main switch $S_{m,2}$. Current flows from $V_{in}^+$ to $V_{out}^+$ through $S_{m,3}$ and through inductor 500b. Capacitor $C_{aux}$ is charged so that node Y1 approaches $V_{in}^+$ and node Y2 approaches $V_{in}^-$.

B) $S_{m,2}$ and $S_{m,3}$ are switched open (off). Switches $S_{a,3}$, $S_{a,4}$, $S_{a,5}$, and $S_{a,6}$ remain on. During the switching open of $S_{m,2}$ and $S_{m,3}$ current from inductor 500a and 500b is diverted respectively through bidirectional switches ($S_{a,3}$ $S_{a,4}$) and ($S_{a,5}$ $S_{a,6}$) with voltage across switches $S_{m,2}$ and $S_{m,3}$ substantially zero. All inductor current flows through $C_{aux}$ from node Y2 to node Y1 which during a period of time dependent on the current in inductors 500a and 500b and the capacitance of $C_{aux}$ inverts the voltage across $C_{aux}$ so that node Y1 is charged to a voltage level equal to $V_{in}^-$ and node Y2 is charged to a voltage level equal to $V_{in}^+$ via auxiliary capacitor $C_{aux}$ C and D) Once $C_{aux}$ is fully charged and inverted, node Y1 is charged to $V_{in}^-$ and Y2 is charged to $V_{in}^+$, current now flows from $V_{out}^-$ through inductor 500a through parallel connected diode of $S_{m,1}$ and current flows from $V_{in}^-$ through the parallel connected diode of $S_{m,4}$, and through inductor 500b to $V_{out}^+$.

E) Auxiliary switches $S_{a3}$, $S_{a,4}$, $S_{a,5}$, and $S_{a,6}$ are now turned off with no current flowing through them nor a voltage across them.

F) Main switches $S_{m,1}$ and $S_{m,4}$ are turned on with substantially zero voltage across them, diverting most of the current from flowing through their parallel connected diodes to flowing through switches $S_{m,1}$ and $S_{m,4}$ themselves.

G) Before the turn on of Sm,2 and Sm,3, main switches Sm,1 and Sm,4 are turned off with zero voltage across them so that current flow is diverted again through their parallel connected diodes.

H) Main switches $S_{m,2}$ and $S_{m,3}$ turn on to begin the next switching cycle. Current of inductor 500a flows from $V_{out}^-$ through inductor 500a, through switch $S_{m,2}$ to $V_{in}^-$; and current of inductor 500b flows from $V_{in}^+$ through $S_{m,3}$ to $V_{out}^+$.

I) Auxiliary switches $S_{a,1}$, $S_{a,2}$, $S_{a,7}$ and $S_{a,8}$ are turned on with zero voltage and zero current.

J) $S_{m,2}$ and $S_{m,3}$ open at zero voltage. All inductor current flows now through from $V_{out}^-$ through inductor 500a, through bidirectional switch ($S_{a,1}$,$S_{a,2}$), through $C_{aux}$, through bidirectional switch ($S_{a,1}$,$S_{a,2}$) from node Y1 to node Y2 which over a period of time (dependent on the current in inductors 500a and 500b and the capacitance of $C_{aux}$) inverts again the voltage across $C_{aux}$ so that node Y1 is charged to a voltage level equal to $V_{in}^+$ and node Y2 is charged to a voltage level equal to $V_{in}^-$ (as it was in (1)).

K) Current flows from $V_{out}^-$ through inductor 500a, through the parallel connected diode of $S_{m,1}$ to $V_{in}^+$. Current flows from $V_{in}^-$ through the parallel connected diode of $S_{m,4}$ and through inductor 500b to $V_{out}^+$.

L) Auxiliary switches $S_{a,1}$, $S_{a,2}$, $S_{a,7}$, and $S_{a,8}$ are turned off with zero voltage and zero current.

M) Main switches $S_{m,1}$ and $S_{m,4}$ are turned on at zero voltage forcing the current through themselves from $V_{out}^-$ through inductor 500a, through $S_{m,1}$, and from $V_{in}^-$ through $S_{m,4}$ and through inductor 500b to $V_{out}+$.

N) Before $S_{m,2}$ and $S_{m,3}$ are turned on, main switches $S_{m,1}$ and $S_{m,4}$ are turned off with zero voltage, the current flowing again from $V_{out}^-$ through inductor 500a, through the diode of $S_{m,1}$, through $V_{in}^+$ and from $V_{in}^-$ through the diode of $S_{m,4}$ and through inductor 500b to $V_{out}^+$.

O) Main switches $S_{m,2}$ and $S_{m,3}$ turn on to begin the next switching cycle. The current flows again from $V_{out}^-$ through inductor 500a, through $S_{m,2}$ to $V_{in}^-$ and from $V_{in}^+$, through $S_{m,3}$ and through inductor 500b to $V_{out}^+$.

P) $S_{a,3}$, $S_{a,4}$, $S_{a,5}$, and $S_{a,6}$ are turned on with zero voltage and zero current.

During the two switching cycles as shown, auxiliary capacitor $C_{aux}$ is charged and discharged by the inductor current with substantially no energy loss due to switching.

The definite articles "a", "an" is used herein, such as "a converter", "a switch" have the meaning of "one or more" that is "one or more converters" or "one or more switches".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method, comprising:
   transferring energy from an input through a first switch to an inductor thereby storing the energy on the inductor during first phases of respective periodic switching cycles of a power converter;
   transferring the energy stored on the inductor through a second switch to an output during second phases of the respective periodic switching cycles;
   changing a voltage at a first node of the inductor by switching at least one auxiliary switch to close a current path to the first node of the inductor through a capacitor while the first and second switches are simultaneously open during transitions from the first phases to the second phases; and
   zero volt switching the first switch and the second switch at different times during the transitions between the first phases and the second phases.

2. The method of claim 1, wherein changing the voltage at the first node of the inductor comprises:
   switching at least one auxiliary switch to close a current path through a capacitor and the inductor.

3. The method of claim 1, wherein switching at least one auxiliary switch comprises:
   switching the at least one auxiliary switch to close the current path to the first node by alternatively charging and discharging the capacitor during respective alternating sequential cycles of the periodic switching cycles.

4. The method of claim 3, wherein switching the at least one auxiliary switch comprises:
during the discharging, switching the at least one auxiliary switch to close a first switched path through the capacitor, inductor, and output; and
during the charging, switching the at least one auxiliary switch to close a second switched path through the capacitor, inductor, and input.

5. The method of claim 3, wherein the charging and the discharging are non-resonant.

6. The method of claim 1, wherein a buck stage includes the first and second switches, and the method further comprises:
changing a voltage at a second node of the inductor; and
zero voltage switching at different times third and fourth switches of a boost stage during the transitions between the first and second phases.

7. The method of claim 6, further comprising:
transferring energy via the third switch to the inductor from a converter input during the first phases; and
transferring the energy via the fourth from the inductor to a converter output during the second phases.

8. A method, comprising:
transferring energy from an input through a first switch to an inductor thereby storing the energy on the inductor during first phases of respective periodic switching cycles of a power converter;
transferring the energy stored on the inductor through a second switch to an output during second phases of the respective periodic switching cycles;
changing a voltage at a first node of the inductor; and
during transitions between the first phases and the second phases, zero voltage switching the first switch from on to off and zero voltage switching the second switch from off to on.

9. The method of claim 8, wherein changing the voltage at the first node of the inductor comprises:
switching at least one auxiliary switch to close a current path through a capacitor and the inductor.

10. The method of claim 8, further comprising switching at least one auxiliary switch to close a current path to the first node of the inductor through a capacitor while the first and second switches are simultaneously open during the transitions from the first phases to the second phases.

11. The method of claim 10, wherein switching the at least one auxiliary switch comprises:
during discharging of the capacitor, switching the at least one auxiliary switch to close a first switched path through the capacitor, inductor, and output; and
during charging of the capacitor, switching the at least one auxiliary switch to close a second switched path through the capacitor, inductor, and input.

12. The method of claim 11, wherein the charging and the discharging are non-resonant.

13. The method of claim 8, wherein a buck stage includes the first and second switches, and the method further comprises:
changing a voltage at a second node of the inductor; and
zero voltage switching at different times third and fourth switches of a boost stage during the transitions between the first and second phases.

14. The method of claim 13, further comprising:
transferring energy via the third switch to the inductor from a converter input during the first phases; and
transferring the energy via the fourth from the inductor to a converter output during the second phases.

15. A method, comprising:
transferring energy from an input through a first switch to an inductor thereby storing the energy on the inductor during first phases of respective periodic switching cycles of a power converter;
transferring the energy stored on the inductor through a second switch to an output during second phases of the respective periodic switching cycles;
changing a voltage at a first node of the inductor;
zero volt switching the first switch and the second switch at different times during transitions between the first phases and the second phases; and
discharging or charging an auxiliary capacitor via a current path through the inductor while the first and second switches are off during the transition from the first phase to the second phase of each respective periodic switching cycle.

16. The method of claim 15, wherein changing the voltage at the first node of the inductor comprises:
switching at least one auxiliary switch to close a current path through a capacitor and the inductor.

17. The method of claim 15, further comprising switching at least one auxiliary switch to close a current path to the first node of the inductor through a capacitor while the first and second switches are simultaneously open during the transitions from the first phases to the second phases.

18. The method of claim 17, wherein switching the at least one auxiliary switch comprises:
during the discharging, switching the at least one auxiliary switch to close a first switched path through the capacitor, inductor, and output; and
during the charging, switching the at least one auxiliary switch to close a second switched path through the capacitor, inductor, and input.

19. The method of claim 17, wherein the charging and the discharging are non-resonant.

20. The method of claim 15, wherein a buck stage includes the first and second switches, and the method further comprises:
changing a voltage at a second node of the inductor; and
zero voltage switching at different times third and fourth switches of a boost stage during the transitions between the first and second phases.

21. The method of claim 20, further comprising:
transferring energy via the third switch to the inductor from a converter input during the first phases; and
transferring the energy via the fourth from the inductor to a converter output during the second phases.

22. A switching converter, comprising:
a first stage comprising: first and second switches, a first auxiliary circuit, an inductor, and a converter input; and
a second stage comprising third and fourth switches, a second auxiliary circuit, the inductor, and a converter output; wherein:
the first and third switches are configured to transfer energy to the inductor from the converter input during first phases of respective periodic switching cycles;
the second and fourth switches are configured to transfer the energy from the inductor to the converter output during second phases of the respective periodic switching cycles;
the first and second auxiliary circuits are connected to different nodes of the inductor; and
the switching converter is configured to zero volt switch off the first and third switches at a beginning of a transition from the first phase to the second phase of each respective periodic switching cycle, wherein the first auxiliary circuit comprises a first capacitor and at least one first auxiliary switch that closes a current path through the first capacitor and the inductor.

23. The switching converter of claim 22, wherein the switching converter is configured to zero volt switch on the second and fourth switches at an end of the transition from the first phase to the second phase of each respective periodic switching cycle.

24. The switching converter of claim 22, wherein the second auxiliary circuit comprises a second capacitor and at least one second auxiliary switch that closes a current path through the inductor and the second capacitor.

25. The switching converter of claim 22, wherein the first auxiliary circuit is configured to provide the current path to a first node of the inductor by alternatively charging and discharging the capacitor during respective alternating sequential cycles of the periodic switching cycles.

26. A switching converter, comprising:
a first stage comprising: first and second switches, a first auxiliary circuit, an inductor, and a converter input; and
a second stage comprising third and fourth switches, a second auxiliary circuit, the inductor, and a converter output; wherein:
the first and third switches are configured to transfer energy to the inductor from the converter input during first phases of respective periodic switching cycles;
the second and fourth switches are configured to transfer the energy from the inductor to the converter output during second phases of the respective periodic switching cycles;
the first and second auxiliary circuits are connected to different nodes of the inductor; and
the switching converter is configured to zero volt switch off the first and third switches at a beginning of a transition from the first phase to the second phase of each respective periodic switching cycle,
wherein the first auxiliary circuit is configured to provide a current path to a first node of the inductor through a capacitor while the first and second switches are simultaneously open during the transitions from the first phases to the second phases.

27. The switching converter of claim 26, wherein the switching converter is configured to zero volt switch on the second and fourth switches at an end of the transition from the first phase to the second phase of each respective periodic switching cycle.

28. The switching converter of claim 26, wherein the first auxiliary circuit comprises a first capacitor and at least one first auxiliary switch that closes a current path through the first capacitor and the inductor or the second auxiliary circuit comprises a second capacitor and at least one second auxiliary switch that closes a current path through the inductor and the second capacitor.

29. The switching converter of claim 26, wherein the first auxiliary circuit is configured to provide the current path to the first node by alternatively charging and discharging the capacitor during respective alternating sequential cycles of the periodic switching cycles.

30. A method, comprising:
during a first phase, switching on a first switch and a first auxiliary switch connected to a first node of an inductor to provide a first current path from an input of a switching converter through the first switch to the inductor, the first auxiliary switch being connected to a capacitor charged to an input voltage of the switching converter; and
during a second phase, maintaining an on state for the first auxiliary switch from the first phase, zero volt switching off the first switch, discharging the capacitor to zero voltage via a second current path from the capacitor through the inductor, and switching on a second switch simultaneously with switching off the first auxiliary switch.

31. The method of claim 30, further comprising:
during a third phase, switching on the first switch and switching off the second switch to provide a current path from the input through the first switch to the inductor, and switching on a second auxiliary switch while the capacitor remains discharged from the second phase.

32. The method of claim 31, further comprising:
during a fourth phase, maintaining an on state for the second auxiliary switch from the third phase, zero volt switching off the first switch, and charging the capacitor to the input voltage via a second current path through the second auxiliary switch, the capacitor, and the inductor.

33. The method of claim 30, further comprising:
during the first phase, switching on a third switch and a second auxiliary switch connected to a second node of the inductor to continue the current path through the third switch back to the input, the second auxiliary switch being connected to a second capacitor charged to an output voltage of the switching converter; and
during the second phase, zero volt switching off the third switch, and discharging the second capacitor to zero via the second current path through the inductor and the second auxiliary switch, and switching on a fourth switch simultaneously with switching off the second auxiliary switch.

* * * * *